(12) United States Patent
Upadhyay et al.

(10) Patent No.: US 11,269,935 B2
(45) Date of Patent: Mar. 8, 2022

(54) SEARCHING FREE-TEXT DATA USING INDEXED QUERIES

(71) Applicant: PayPal, Inc., San Jose, CA (US)

(72) Inventors: Rushik Upadhyay, San Jose, CA (US); Aditya Kaulagi, Singapore (SG); Meng Shi, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/729,649

(22) Filed: Dec. 30, 2019

(65) Prior Publication Data

US 2021/0200795 A1    Jul. 1, 2021

(51) Int. Cl.
*G06F 16/332* (2019.01)
*G06F 16/33* (2019.01)
*G06F 40/295* (2020.01)
*G06F 16/9535* (2019.01)

(52) U.S. Cl.
CPC ...... *G06F 16/3322* (2019.01); *G06F 16/3334* (2019.01); *G06F 16/3344* (2019.01); *G06F 16/9535* (2019.01); *G06F 40/295* (2020.01)

(58) Field of Classification Search
CPC ............. G06F 16/3322; G06F 16/3334; G06F 16/3344; G06F 16/9535; G06F 40/295; G06F 16/212; G06F 16/221; G06F 16/93; G06F 16/2282; G06F 16/258; G06F 16/313; G06F 40/30; G06F 16/2228; G06F 16/2465; G06F 2216/03; G06F 40/20; G06F 40/279
USPC ........................................................ 707/706
See application file for complete search history.

(56) References Cited

U.S. PATENT DOCUMENTS

| | | | |
|---|---|---|---|
| 7,305,385 B1* | 12/2007 | Dzikiewicz | G06F 7/02 707/745 |
| 2006/0253476 A1 | 11/2006 | Roth et al. | |
| 2013/0124564 A1* | 5/2013 | Oztekin | G06F 16/9537 707/770 |
| 2013/0332438 A1* | 12/2013 | Li | G06F 16/9535 707/706 |
| 2015/0309992 A1 | 10/2015 | Visel | |

* cited by examiner

*Primary Examiner* — Evan Aspinwall
(74) *Attorney, Agent, or Firm* — Haynes and Boone LLP

(57) ABSTRACT

A system performs operations that include determining match text data based on a comparison between input text data and an index of keywords and identifying a set of match word tokens from the match text data. The operations further include determining one or more solution sets of input word tokens based on comparing the set of match word tokens and the input text data. Additionally, the operations include calculating a respective solution set score for each of the one or more solution sets of input word tokens based on the calculated similarity values. A match between the input text data and the match text data is determined based on the first solution set score satisfying a score threshold.

20 Claims, 7 Drawing Sheets

SEARCHING FREE-TEXT DATA USING INDEXED QUERIES

BACKGROUND

Technical Field

This disclosure relates generally to search algorithms and, more specifically, to searching free-text data using indexed queries.

Description of the Related Art

Typical search algorithms, such as web searches, use keywords as queries into indexed data, such as indexed webpages. In other words, free-text documents are typically indexed to be searched, and during a real-time search, keywords are provided by a user to search across these various indexed free-text documents.

In certain contexts, the above paradigm may be reversed in that a list of keywords may be indexed, and this index of keywords may be used as search terms to search an (unindexed) free-text document. For example, the list of keywords may correspond to one or more entity names (e.g., names of persons, organizations, geographic locations, etc.), and the free-text document may be searched to determine whether any of the entities are included in the free-text document.

Figure 1:
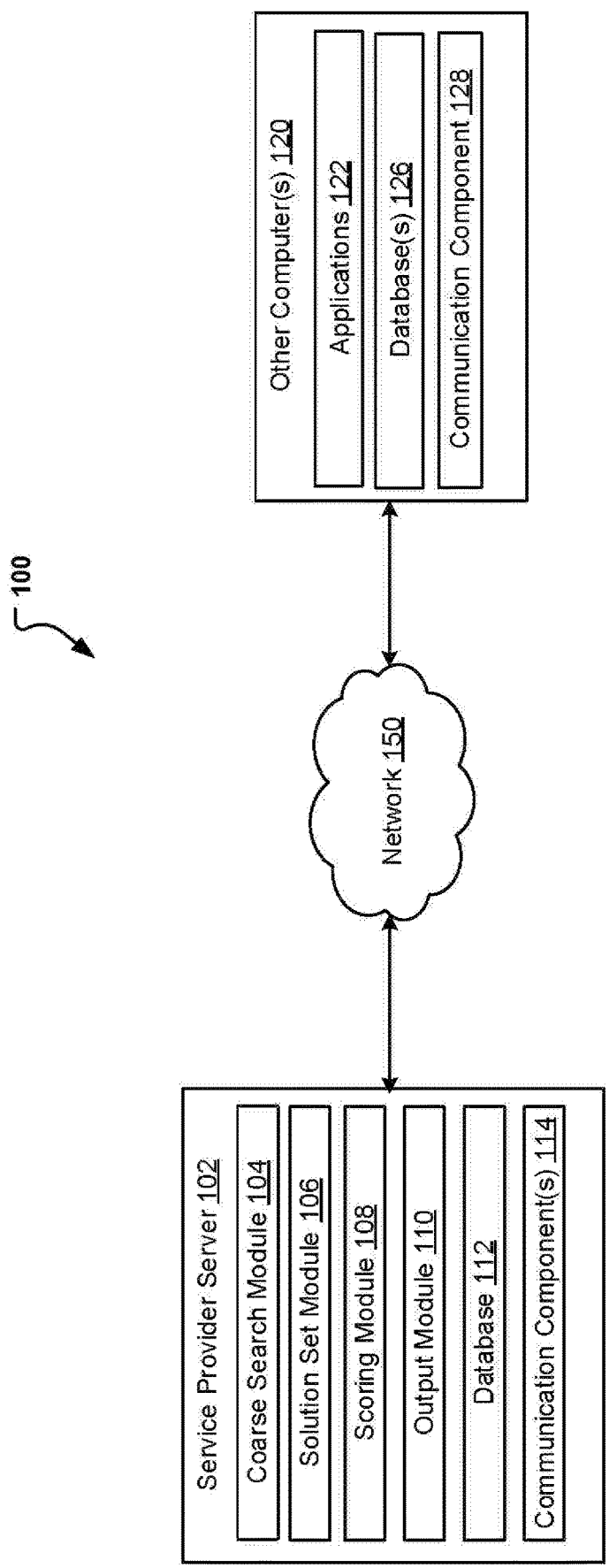
FIG. 1 is a block diagram illustrating an example system for searching free-text data using indexed queries, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "solution set module" "configured to generate one or more solution sets" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for an algorithm for searching free-text data using indexed queries. A service provider server may receive input text data and an index of keywords (hereinafter referred to as the "keyword index"). In certain embodiments, the keyword index may correspond to an indexed list of entity names (e.g., including but not limited to people, companies, geographic locations, other organizations, and/or the like.) Further, the input text data may correspond to free-text documents including, but not limited to, text documents, webpages, news articles, blogs, payment transaction information, other digital transaction information, etc.

The service provider server may also receive instructions to use the keyword index as search queries over the input text data. In other words, the service provider sever may be configured to search the input text data for any entity names included in the keyword index. Under this framework, certain challenges may be presented. For instance, consider input text data that represents the sentence "From my recycle bin I found book on ben laden" and a keyword index that includes the entity name "Bin Laden." In a typical keyword search, potential results for this example might consider the words "bin" and "laden" to determine whether a potential match exists. However, from the context of the sentence, it is clear that the word "bin" does not refer to a name but rather an object (e.g., a container for trash). Instead, the phrase "ben laden" should be considered for a potential match for the entity name.

Therefore, according to a particular embodiment, the service provider server is configured to first perform a coarse search to of the input text data using the keyword index. The coarse search may output a set of match word tokens from the keyword index that are potentially included in the input text data. For each match word token in the set of match word tokens, the service provider server determines a respective set of input word tokens from the input text data (e.g., a free-text document). Each input word token in a respective set of input word tokens is a potential match for its corresponding match word token.

Further, the service provider server also determines a respective similarity value for each input word token and its corresponding match word token. The similarity value may be calculated based on an edit distance between the input word token and its corresponding match word token as well as the length of the match word token. Additionally, the service provider server also determines a respective index position for each input word token in the input text data. For instance, referring again to the example sentence above, the word "from" may have an index position of 0, the word "my" an index position of 1, the word "recycle" an index position of 2, and so on.

The service provider server generates one or more solution sets based on the respective sets of input word tokens. As such, each solution set includes an input word token from each respective set of input word tokens. Based on the calculated similarity values and the index positions for each input word token, the service provider server calculates a final similarity score for each solution set. To this end, the service provider server selects the solution set having the highest final similarity score and based on this score, determines whether the entity name represented by the set of match word tokens is a match for (e.g., included in) the input word text data.

FIG. 1 is a block diagram illustrating an example system 100 for searching free-text data using indexed queries. In the illustrated embodiment, the system 100 includes a service provider server 102 in communication with other computer(s) 120 via a network 150. The service provider server 102 may be configured to receive a keyword index and input text data. According to a particular embodiment, the keyword index may correspond to an index of a list of entity names (e.g., persons, places, organizations, and/or the like). The input text data may be any text document, such as word processing documents, webpages, news articles, blogs, other online documents, text-based metadata, emails, and/or the like.

For example, the service provider server 102 may analyze digital transactions to determine whether any party to the digital transaction (e.g., payors, payees, customers, merchants, etc.) is a known suspicious entity. Known suspicious entities may be individuals and/or organizations that are known to perpetrate fraud, terrorism, and/or other criminal or undesirable activities. In this context, the keyword index may correspond to a list of known suspicious entities, and the input text data may be any type of text-based data associated with the digital transaction, such as text related to the names of the parties to the transaction, item descriptions for items being purchased, financial information, and/or the like. The service provider server may compare the keyword index with the input text data and flag the digital transaction and/or generate alerts if a match between the keyword index and the input text data is determined.

It will be appreciated that the above examples are for illustrative purposes and that various other contexts for using this free-text search algorithm are also possible. Further, the keyword index may be stored on the service provider server 102 and/or any other third-party computer or database, such as other computer 120

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider server 102 may include a coarse search module 104, a solution set module 106, a scoring module 108, an output module 110, a database 112, and communication component(s) 114. Each of the components of the service provider server 102 may communicate with each other to perform a search of free-text data using indexed queries, as will be described in more detail below.

The coarse search module 104 is configured to perform a coarse search of the input text data using the keyword index. In some implementations, the coarse search is a trigram word search, which may match three-character strings and substrings from the keyword index with those of the input text data. In other implementations, the coarse search is another type of text search. As a result of the of the coarse search, the coarse search module 104 outputs a set of match word tokens that are potential "matches" for in the input text data. In other words, the set of match word tokens may correspond to a particular entity name from the keyword index that is potentially included in the input text data.

Figure 3:
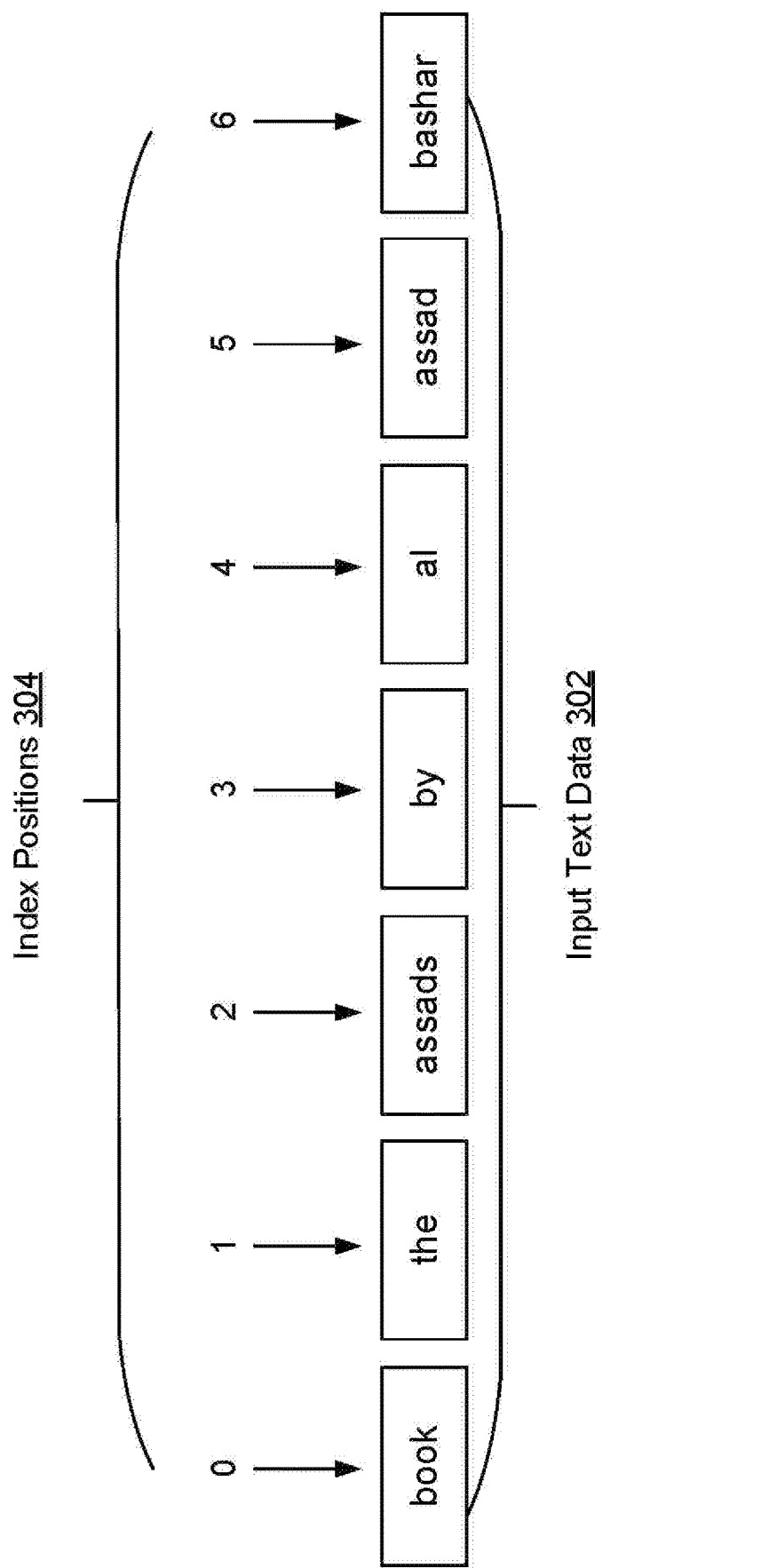
FIG. 3 illustrates a diagram of index positions of word tokens, according to some embodiments.

For example, consider the input text data 302 "book the assads by al assad bashar" as shown in FIG. 3. For the purposes of this example, the output of the coarse search performed by the coarse search module 106 on the input text data using the keyword index may be the set of match word tokens "al assad bashar".

The solution set module 106 is configured to generate one or more solution sets. To this end, for each match word token in the set of match word tokens, the solution set module 106 module determines a respective set of input word tokens corresponding to the match word token. Each input word token in a respective set of input word tokens is a potential match to its corresponding match word token. According to certain embodiments, the respective edit distance between each input word token and its corresponding match word token satisfies a distance threshold (e.g., less than or equal to the distance threshold).

TABLE 1

| Match Word Tokens | Input Word Tokens |
|---|---|
| al | al (4, 0, 2) |
| assad | assads(2, 1, 4), assad (5, 1, 5) |
| bashar | bashar (6, 2, 6) |

The solution set module 106 may also be configured to determine, for each input word token, an index position of the input word token with respect to the input text data, an index position of the corresponding match word token in the set of match word tokens, and a similarity value between the input word token and the corresponding match word token. For instance, the solution set module 106 may store this information in a vector that is associated with input word token, where the vector has the format:

(input word token index, match word token index, similarity value).

For example, referring to the above example, the solution set module 106 may store such information in a table, such as shown in Table 1. As shown in table 1, match word token "al" corresponds to input word token "al." Match word token "assad" corresponds to input word tokens "assads" and "assad". Match word token "bashar" corresponds to input word token "bashar." It will be appreciated that the table depicted in Table 1 is merely exemplary, and that in other embodiments, the solution set module 106 may store such information in another suitable data structure.

Further, as show in Table 1, each input word token is associated with a vector having the format previously discussed. Thus, input word token "al" may have an index position of 4 within the input text data, its corresponding match word token "al" may have an index position of 0 within the set of match word tokens, and the similarity value between input word token "al" and match word token "al" may be calculated as 2. According to a particular embodiment, the similarity value between a particular input word token and its corresponding match word token may be given by the formula:

Similarity Value=match word token length−edit distance where the match word token length corresponds to the number of characters included in the match word token.

FIG. 3 illustrates an example framework by which index position 304 of input text data 302 may be determined. As show in FIG. 3, the index positions 304 of the input word tokens in the input text data 302 "book the assads by al assad bashar" are consecutive integers starting at 0 for "book", then 1 for "the," and so forth. A similar indexing framework is also used for the match word tokens in the set of match word tokens. Further, the same indexing framework is used for input word tokens and match word tokens depicted in Table 1. It will be appreciated that the indexing framework depicted in FIG. 3 is merely an example and that other indexing schemes are also possible.

Referring back to FIG. 1, the solution set module 106 generates one or more solution sets such that each solution set includes an input word token from each respective set of input word tokens that correspond to each match word token. For example, the solution set module 106 may generate two solution sets from the information stored in Table 1. As shown in Table 2, a first solution set may include the input word tokens "assads al bashar" and a second solutions set may include the input word tokens "al assad bashar." The input word tokens included in each solution set may be ordered by their respective input word token index.

TABLE 2

| Solution Set | $1^{st}$ token (i = 1) | $2^{nd}$ token (i = 2) | $3^{rd}$ Token (i = 3) | Final Similarity Score |
|---|---|---|---|---|
| (2)assads (4)al (6)bashar | 4 | 2 − 0.5 = 1.5 | 6 − 0.5 = 5.5 | (4 + 1.5 + 5.5)/ 13 = .85 |
| (4)al (5)assad (6)bashar | 2 | 5 | 6 | (2 + 5 + 6)/ 13 = 1 |

The scoring module 108 may be configured to calculate a final similarity score for each solution set generated by the solution set module 106. According to the particular embodiment corresponding to Table 2, the final similarity score may be calculated by the formula:

Final Similarity Score=For each $i^{th}$ input token in the solution set, (Σ(similarity value$_i$−proximity penalty$_i$))/(total length of match word tokens)

The proximity penalty for a given input word token may be determined based on a comparison between the index position of the input word token and that of its immediately preceding input word token in the solution set. In certain embodiments, a predetermined proximity penalty may be applied if a difference between the index positions are within a threshold range.

According to the example used in Table 2, the solution set represented by the first row includes input word tokens "assads" with an index position of 2, "al" with an index position of 4, and "bashar" with an index position of 6. In this example, a penalty of 0.5 may be applied to the similarity value associated with an input word token if a difference between its index position and that of its immediately preceding token is greater than 1 and less than 4. As such, input word token "assads" has a similarity value of 4 with no penalty applied since there is no preceding input token in the solution set. Input word token "al" has a similarity value of 2, with a penalty of 0.5 applied since the difference between its index position (4) and the index position of "assads" (2) is 2. Input word token "bashar" has a similarity value of 6, with a penalty of 0.5 applied since the difference between its index position (6) and the index position of "al" (4) is 2.

Summing the respective similarity values and proximity penalties associated with each input word token in the solution set results in a value of 11. The total length of the match word tokens is given by the total number of characters in "al assad bashar" which is 13. Thus, the final similarity score is 11 divided by 13 which is equal to 0.85. Using the same method of calculation described above, the scoring module 108 calculates the final similarity score for the solution set represented in the second row ("al assads bashar") as 1. It will be appreciated that the scoring algorithm for determining final similarity scores that was just described is merely an example and that other scoring algorithms are also contemplated.

The scores for each solution set are provided to the output module 110. The output module 110 is configured to select the solution set having the highest final similarity score. The output module 110 determines whether the final similarity score of the selected solution set satisfies a score threshold. If so, the output module 110 outputs an indication that the set of match word tokens are a "match" for the input text data (e.g., the input text data includes the set of match word tokens).

In the example depicted by Table 2, the output module 110 selects the solution set represented by the second row with input word tokens "al assad bashar" since it is associated with the greatest final similarity score. Assuming that the final similarity score satisfies the score threshold, the output module 110 may output an indication that the set of match word tokens ("al assad bashar") from the keyword index are included in the input text data. The set of match word tokens are thus a match for the input word text data.

The database 112 stores various information that the modules of the service provider server 102 may access. For example, the database 112 may store the keyword index, solution set information, similarity values, final similarity scores, the information included in Table 1 and Table 2, and/or any other type of information used for searching free-text data using indexed queries. Further, the database 112 may be implemented using various types data storage that are described in more detail with reference to the storage 712 in FIG. 7.

The communication component 114 may be configured to communicate with various other devices, such as the other computer(s) 120 and/or other devices. In various embodiments, communication component 114 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the other computer(s) 120, each of which includes applications 122, database 126, and communication component 128. According to one or more embodiments, the user computer 120 may provide, via the user application 122, input text data to the service provider server 102.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
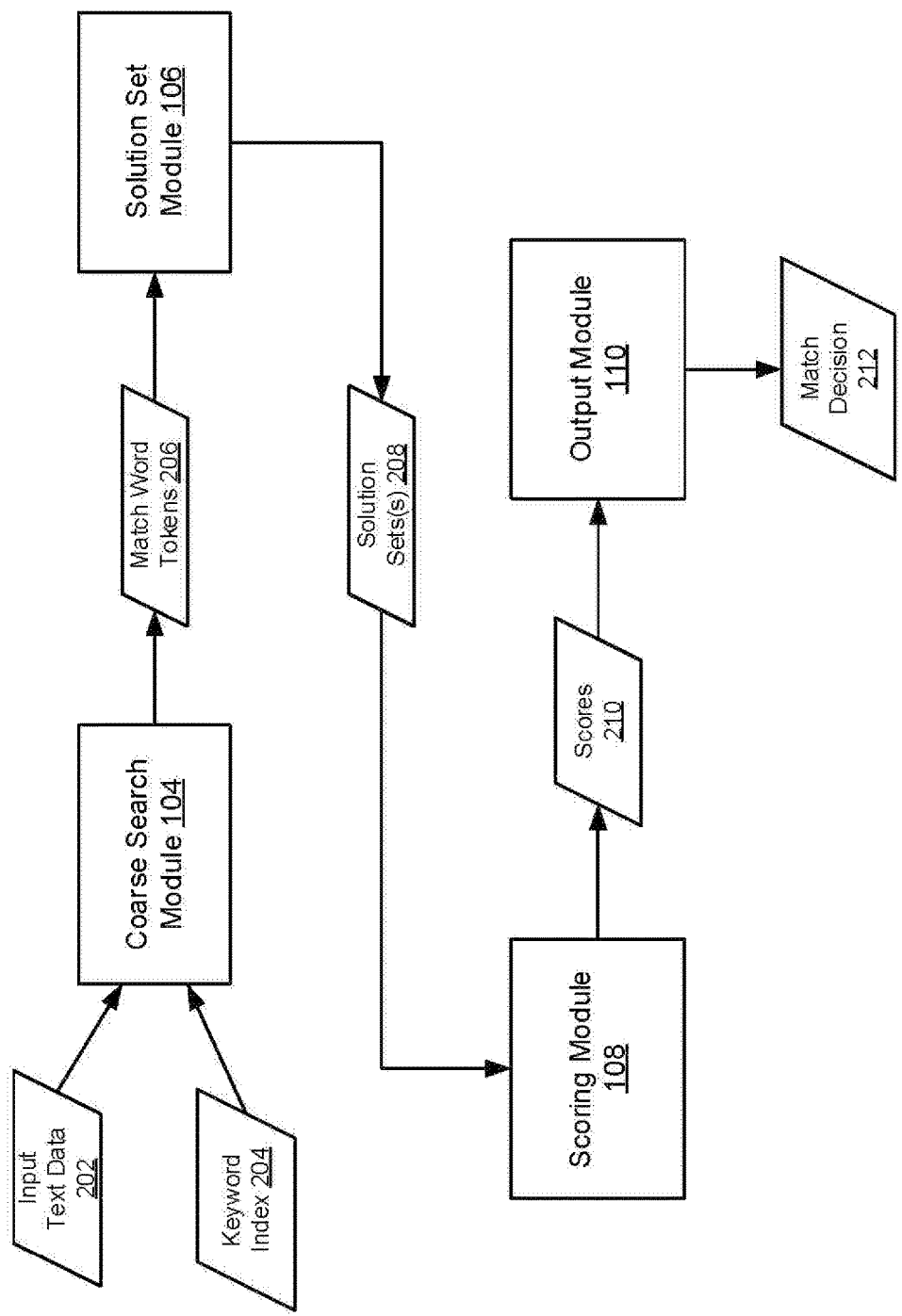
FIG. 2 illustrates a diagram illustrating a data flow for searching free-text data using indexed queries, according to some embodiments.

FIG. 2 illustrates a data flow diagram 200 searching free-text data using indexed queries in accordance with a particular embodiment. As shown in FIG. 2, input text data 202 and keyword index 204 are provided to the coarse search module 104. The coarse search module 104 performs a coarse search on the input text data using the keyword index 204. As previously discussed, the coarse search may be a trigram search, but other types of keyword searches are also possible. Based on the coarse search, the coarse search module 104 outputs a set of match word tokens 206.

The match word tokens 206, which represent words that are potentially included in the input text data 202, are provided to the solution set module 106. As previously discussed, based on comparisons between the set of match word tokens 206 and input tokens from the input text data 202, the solution set module 106 outputs one or more solutions sets 208. The solution sets 208 are then provided to the scoring module 108.

The scoring module 108 calculates final similarity scores 210 for each of the solution sets 208. As previously discussed, the final similarity score for a solution set is calculated based on respective similarity values between the input word tokens of the solution set and the set of match word tokens 206. Further, proximity penalties may be added based on the respective index positions of the input word tokens in the input text data 202. The scoring module 108 provides the final similarity scores 210 to the output module 110.

The output module 110 selects, from the one or more solutions 208, the solution set associated with the highest final similarity score 208. The output module 110 determines whether the final similarity score of the selected solution set satisfies a score threshold. Based on this determination, the output module 110 outputs a match decision 212. For example, if the final similarity score satisfies the score threshold, the output module 110 outputs an indication of a match between the keyword index 204 and the input text data 202. In particular, the output module 110 may indicate that the set of match word tokens 206 is included in the input text data 202.

Figure 4:
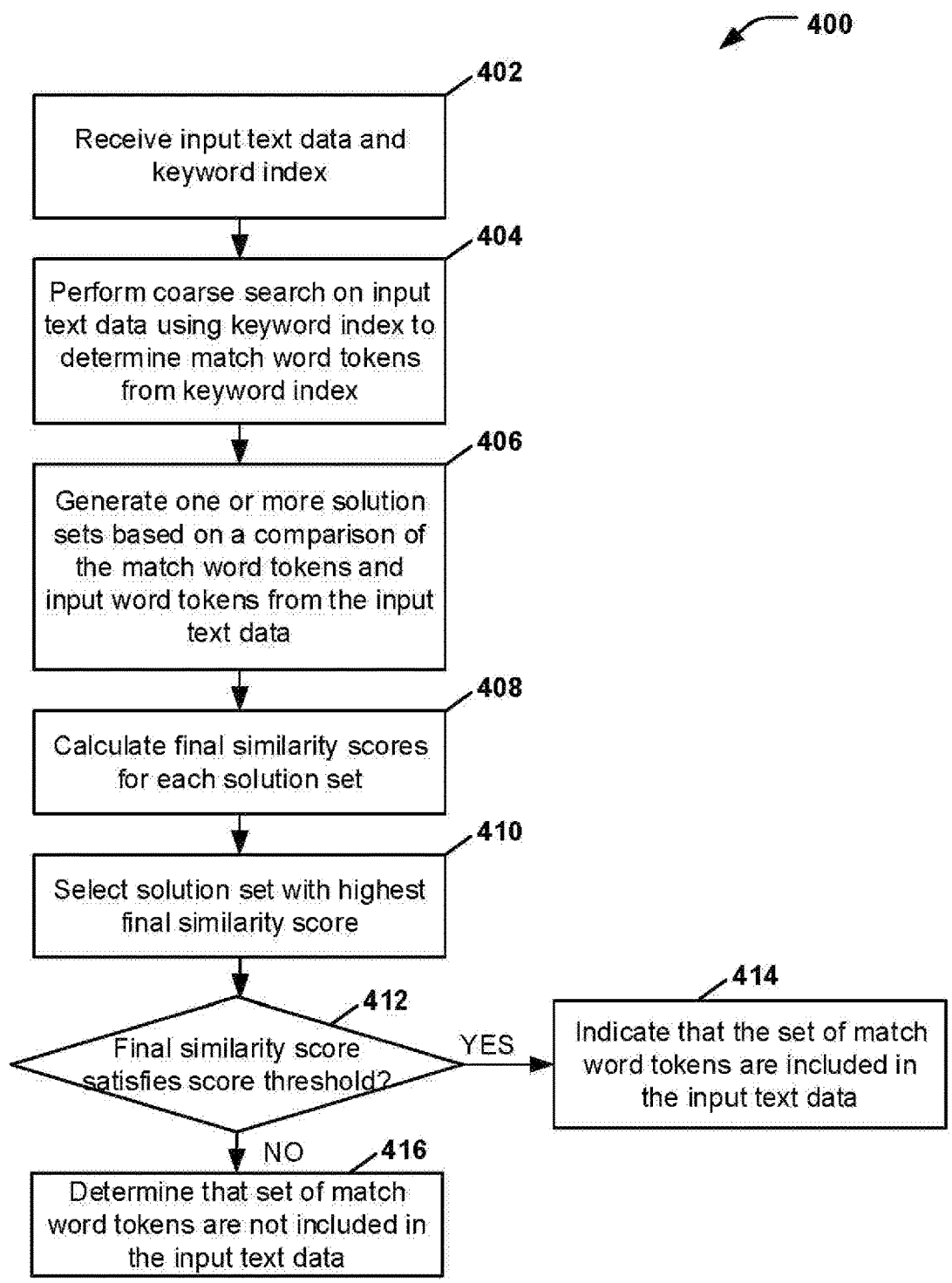
FIG. 4 is a flow diagram illustrating a method for searching free-text data using indexed queries, according to some embodiments.

FIG. 4 illustrates an example flow diagram of a method 400 for searching free-text data using indexed queries, according to one or more particular embodiments. The method 400 may be performed by one or more components of the service provider server 102. The method begins at step 402, where the service provider 102 receives in put text data and a keyword index.

At step 404, the service provider server performs a coarse search on the input text data using the keyword index. The coarse search results in a set of match word tokens included in the keyword index that are potential matches for words in the input text data. At step 406, the service provider server generates one or more solution sets based on a comparison of the set of match word tokens and input word tokens from the input text data.

At step 408, the service provider server 102 calculates a respective final similarity score for each solution set previously generated. At step 410, the service provider 102 selects, from the one or more generated solutions sets, the solution set having the highest final similarity score. At step 412, the service provider server 102 determines whether the final similarity score of the selected solution set satisfies a score threshold.

If the service provider server 102 determines that the final similarity score satisfies the score threshold, the method 400 proceeds to step 414. At step 414, the service provider server 102 outputs an indication that the set of match word tokens are included in the input text data. On the other hand, if the service provider server 102 determines that the final similarity score fails to satisfy the score threshold, the method 400 proceeds to step 416. At step 416, the service provider server 102 determines that the input text data does not include the set of match word tokens. As a result, the service provider server 102 may also determine that there is no match between the input text data and the keyword index.

Figure 5:
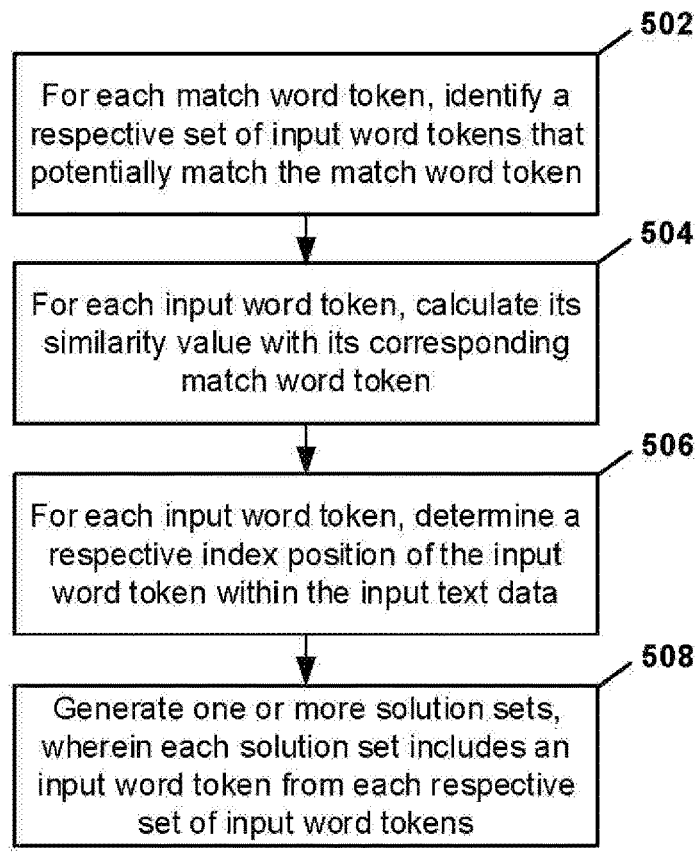
FIG. 5 illustrates a flow diagram illustrating a method for generating solution sets, according to some embodiments.

Referring now to FIG. 5 a flow diagram is depicted of a method 500 for generating solution sets, according to one or more particular embodiments. The method 500 may detail a method for performing step 406 of FIG. 4. The method 500 begins at step 502, where for reach match word token in the set of match word tokens, the service provider server 102 identifies a respective set of input word tokens that potentially match the match word token. For instance, the service provider server 102 may determine and edit distance between each input word token in the input text data and a particular match word token. If the edit distance between a particular input word token and the particular match word token is less than an distance threshold, the input word token may be included in the respective set of input word tokens corresponding to the particular match word token.

At step 504, the service provider server 102 may, for each input word token, calculate its similarity value with its corresponding match word token. The similarity value may be calculated according to the formula previously discussed with respect to FIG. 1. At step 506, the service provider server 102 may, for each input word token, determine a respective index position of the input word token within the input text data.

At step 508, the service provider server 102 may generate one or more solution sets such that each solution set includes an input word token from each respective set of input word tokens.

Figure 6:
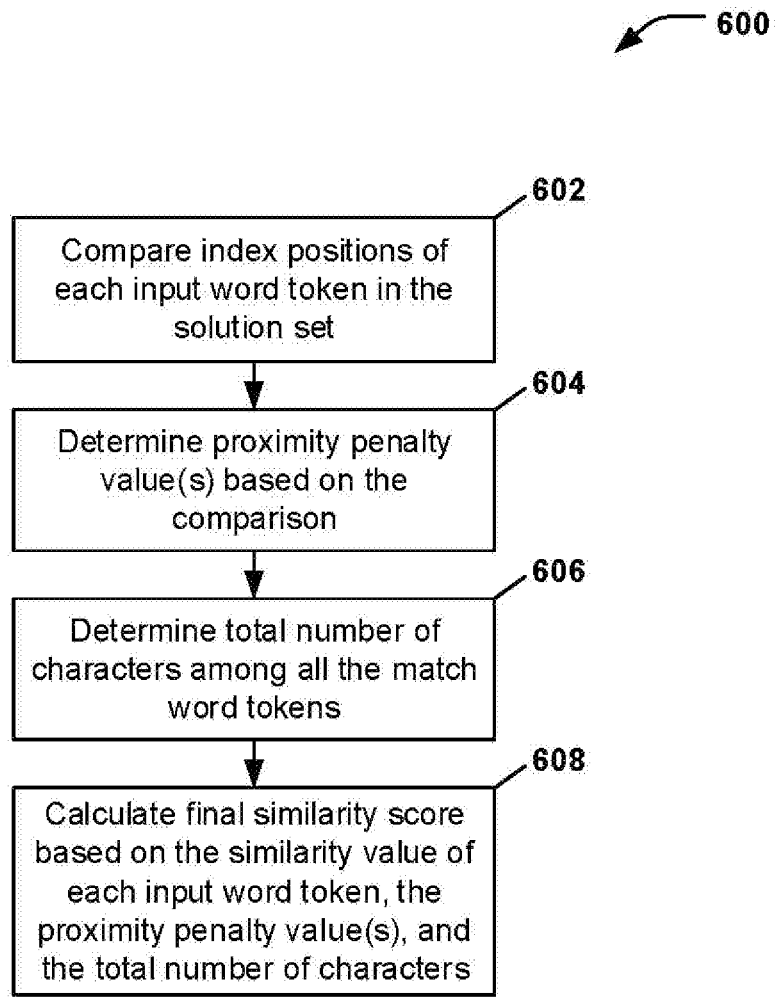
FIG. 6 a flow diagram illustrating a method for calculating a final similarity score for a solution set, according to some embodiments

Referring now to FIG. 6 a flow diagram is depicted of a method 600 for calculating a final similarity score for a solution set, according to one or more particular embodiments. The method 600 may detail a method for performing step 408 of FIG. 4 and assumes that the steps of method 500 of FIG. 5 have been performed.

The method 600 may begin at step 602, where the service provide server 102 compares the index positions of each input word token in the solution set, and at step 604, the service provider server 102 determines one or more proximity penalty values based on the comparison. At step 606, the service provider server 102 determines a total number of characters among all of the match word tokens in the set of match word tokens. At step 608, the service provider 102 calculates the final similarity score for the solution set based on the respective similarity values of each input word token in the solution set, the proximity penalty value(s), and the total number of characters of all the match word tokens.

Example Computing Device

Figure 7:
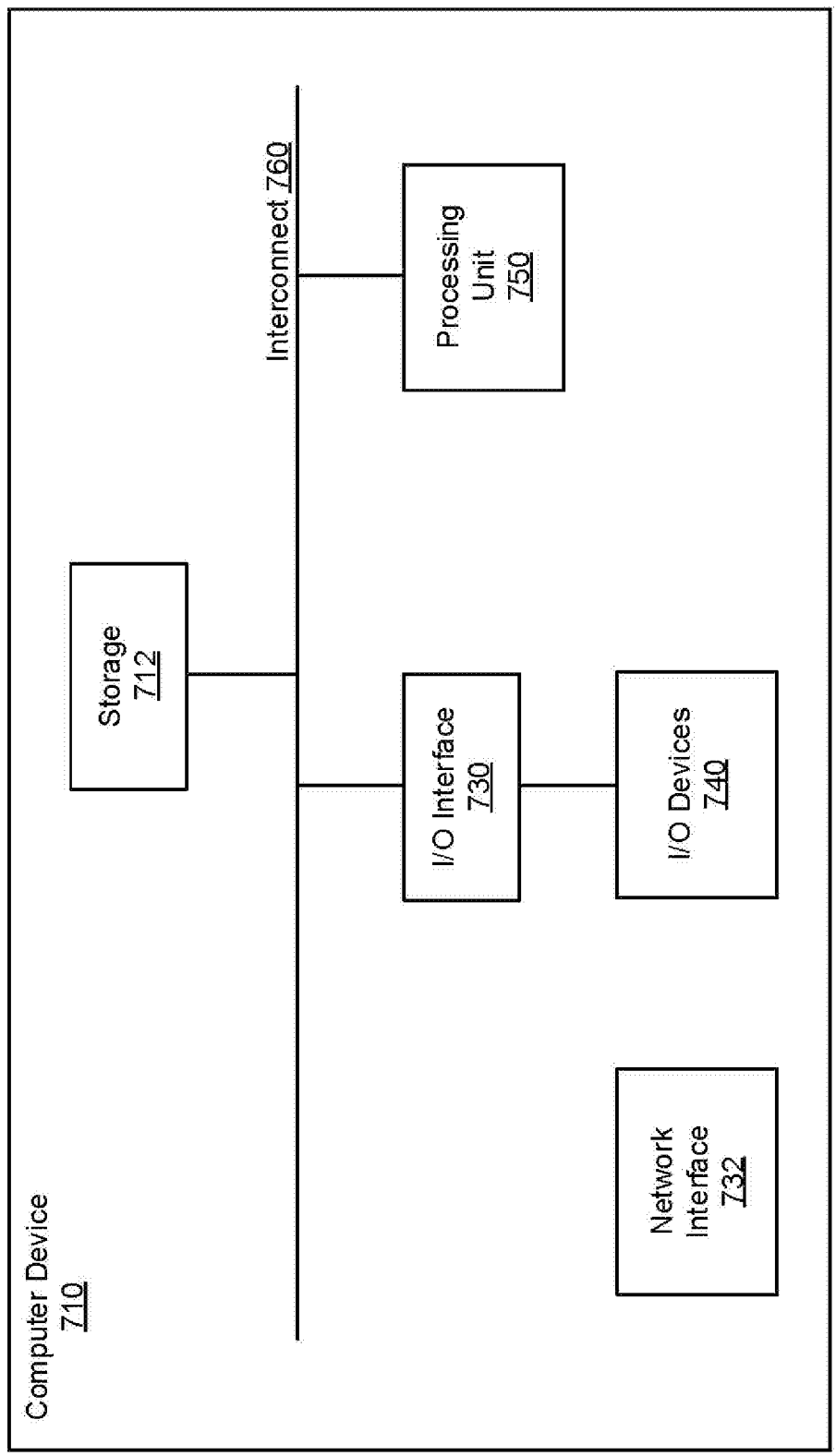
FIG. 7 is a block diagram illustrating an exemplary computing device, according to some embodiments.

Turning now to FIG. 7, a block diagram of one embodiment of computing device (which may also be referred to as a computing system) 710 is depicted. Computing device 710 may be used to implement various portions of this disclosure including any of the components illustrated in FIG. 1 and FIG. 2. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
one or more hardware processors; and
a non-transitory memory storing computer-executable instructions, that in response to execution by the one or more hardware processors, causes the system to perform operations comprising:

receiving a search request based on an index of keywords, wherein the index of keywords comprises a first entity name that includes a sequence of keywords;

accessing, from a plurality of free-text documents, a first free-text document comprising a plurality of word instances;

generating a plurality of input word tokens based on matching word instances in the first free-text document to the first entity name, wherein each input word token in the plurality of input word tokens corresponds to a word instance within the first free-text document that matches any one keyword in the sequence of keywords of the first entity name;

calculating, for each input word token in the plurality of input word tokens, a similarity value based on a level of similarity between the corresponding word instance and a matched keyword in the first entity name;

determining a plurality of solution sets based on the plurality of input word tokens, wherein each solution set in the plurality of solution sets comprises a subset of the plurality of input word tokens having corresponding word instances that match the sequence of keywords of the first entity name;

calculating, for each solution set in the plurality of solution sets, a respective solution set score based on the similarity values calculated for the corresponding subset of the plurality of input word tokens and distances between the corresponding word instances within the first free-text document; and determining a match between the first free-text document and the first entity name based on a first solution set score calculated for a first solution set from the plurality of solution sets satisfying a score threshold.

2. The system of claim 1, wherein the first free-text document comprises at least one of a webpage, an article, or a blog.

3. The system of claim 1, wherein the operations further comprise:

performing a trigram search on the first free-text document based on the d sequence of keywords.

4. The system of claim 1, wherein the first solution set comprises a first subset of the plurality of input word tokens, and wherein the calculating the respective solution set score comprises calculating the first solution set score for the first solution set based on relative positions of the word instances corresponding to the first subset of the plurality of input word tokens within the first free-text document.

5. The system of claim 4, wherein the calculating the first solution set score comprises:

determining an order that the word instances corresponding to the first subset of the plurality of input word tokens appears in the first free-text document.

6. The system of claim 4, wherein the first solution set includes a first input word token associated with a first position within the first free-text document and a second input word token associated with a second position within the first free-text document, and wherein the calculating the first solution set score further comprises:

calculating a difference between the first position and the second position.

7. The system of claim 1, wherein the first solution set score is greater than the respective solution set scores calculated for the remainder solution sets in the plurality of solution sets.

8. The system of claim 1, wherein the calculating the similarity value for each input word token comprises:

calculating, for a first input word token in the plurality of input word tokens, a first similarity value based on an edit distance between first input word token and a first matched keyword.

9. The system of claim 8, wherein the calculating the first similarity value is further based on a number of characters included in the matched keyword.

10. A method, comprising:

receiving, by one or more hardware processors, a search request based on an index of keywords, wherein the index of keywords comprises a first entity name that includes an sequence of keywords;

accessing, by the one or more hardware processors from a plurality of free-text documents, a first free-text document comprising a plurality of word instances;

determining, by the one or more hardware processors, a plurality of input word tokens based on matching word instances in the first free-text document to the first entity name, wherein each input word token in the plurality of input word tokens corresponds to a word instance within the first free-text document that matches any one keyword in the sequence of keywords of the first entity name;

calculating, by the one or more hardware processors for each input word token in the plurality of input word tokens, a similarity value based on a level of similarity between the corresponding word instance and a matched keyword in the first entity name;

determining, by the one or more hardware processors, a plurality of solution sets based on the plurality of input word tokens, wherein each solution set in the plurality of solution sets comprises a subset of the plurality of input word tokens having corresponding word instances that match the sequence of keywords of the first entity name;

calculating, by the one or more hardware processors for each solution set in the plurality of solution sets, a respective solution set score based on the similarity values calculated for the corresponding subset of the plurality of input word tokens and distances between the corresponding word instances within the first free-text document; and determining, by the one or more hardware processors, a match between the first free-text document and the first entity name based on a first solution set score calculated for a first solution set from the plurality of solution set satisfying a score threshold.

11. The method of claim 10, wherein the free-text document comprises at least one of a webpage, an article, or a blog.

12. The method of claim 10, wherein the generating the plurality of input word tokens comprises:

performing a trigram search on the first free-text document based on the first entity name.

13. The method of claim 10, further comprising:

identifying a first word instance within the first free-text document as a potential match with a first keyword in the sequence of keywords based on a first edit distance between the first word instance and the first keyword satisfying a distance threshold; and identifying a second word instance within the first free-text document as a potential match with the first keyword based on a second edit distance between the second word instance and the first keyword satisfying the distance threshold.

14. The method of claim 10, wherein the calculating the similarity value comprises calculating, for a first input word token from the plurality of input word tokens, a first similarity value based on a first edit distance between the first input word token and a first keyword from the sequence of keywords token and a number of characters included in the first keyword.

15. The method of claim 14, wherein the calculating the similarity value further comprises calculating, for a second input word token from the plurality of input word tokens, a second similarity value based on a second edit distance between the second input word token and a second keyword from the sequence of keywords and a number of characters included in the second keyword.

16. The method of claim 10, further comprising:
determining an order that the word instances corresponding to the first subset of the plurality of input word tokens appears in the first free-text document.

17. A non-transitory computer readable medium storing computer-executable instructions that in response to execution by one or more hardware processors, causes a system to perform operations comprising:
receiving a search request based on an index of keywords, wherein the index of keywords comprises a first entity name that includes an sequence of keywords;
accessing, from a plurality of free-text documents, a first free-text document comprising a plurality of word instances;
generating a plurality of input word tokens based on matching word instances in the first free-text document to the first entity name, wherein each input word token in the plurality of input word tokens corresponds to a word instance within the first free-text document that matches any one keyword in the sequence of keywords of the first entity name;
determining, for each input word token in the plurality of input word tokens, a similarity score based on a level of similarity between the corresponding word instance and a matched keyword in the first entity name;
generating a plurality of solution sets based on the plurality of input word tokens, wherein each solution set in the plurality solution sets comprises a subset of the plurality of input word tokens having corresponding word instances that match the sequence of keywords of the first entity name;
calculating, for each solution set in the plurality of solution sets, a respective solution set score based on the similarity values calculated for the corresponding subset of the plurality of input word tokens and distances between the corresponding word instances within the first free-text document; and
determining a match between the first free-text document and the first entity name based on a first solution set score calculated for a first solution set form the plurality of solution sets satisfying a score threshold.

18. The non-transitory computer readable medium of claim 17, wherein the is a first free-text document comprises at least one of a webpage, an article, or a blog.

19. The non-transitory computer readable medium of claim 17, wherein the operations further comprise:
identifying a first word instance within the first free-text document as a potential match with a first keyword in the sequence of keywords based on an edit distance between the first word instance and the first keyword satisfying a distance threshold.

20. The non-transitory computer readable medium of claim 17, wherein the operations further comprise:
performing a trigram search on the plurality of word instances based on the index of keywords.

* * * * *